United States Patent
Jahnke et al.

(10) Patent No.: US 6,596,780 B2
(45) Date of Patent: Jul. 22, 2003

(54) MAKING FISCHER-TROPSCH LIQUIDS AND POWER

(75) Inventors: Fred C. Jahnke, Rye, NY (US); Dipak C. Kothari, Sugar Land, TX (US); Lalit S. Shah, Sugar Land, TX (US); William P. Volk, Danbury, CT (US); Kamlesh B. Vakil, Sugar Land, TX (US); Rui Song, Houston, TX (US); Gayla D. Hamby, Houston, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 10/001,783

(22) Filed: Oct. 23, 2001

(65) Prior Publication Data

US 2003/0083391 A1 May 1, 2003

(51) Int. Cl.$^7$ .................... C07C 27/00; C10L 1/04; F02B 43/00; F02G 3/00
(52) U.S. Cl. ............. 518/700; 518/702; 518/703; 208/15; 208/16; 60/39.12; 60/39.05
(58) Field of Search ............... 518/700, 702, 518/703; 208/15, 16; 60/39.12, 39.05

(56) References Cited

U.S. PATENT DOCUMENTS

| | | | |
|---|---|---|---|
| 3,986,349 A | 10/1976 | Egan | 60/39.02 |
| 4,092,825 A | 6/1978 | Egan | 60/39.02 |
| 4,433,065 A | 2/1984 | Van der Burgt et al. | 518/703 |
| 4,549,396 A | 10/1985 | Garwood et al. | 60/39.02 |
| 5,865,023 A | 2/1999 | Sorensen et al. | 60/39.02 |
| 6,248,794 B1 * | 6/2001 | Gieskes | 518/700 |
| 6,306,917 B1 * | 10/2001 | Bohn et al. | 518/700 |

* cited by examiner

Primary Examiner—J. Parsa
(74) Attorney, Agent, or Firm—A. Stephen Zavell; Josetta I. Jones; Frank G. Turner (57) ABSTRACT

Hydrocarbonaceous fuel, such as coal, oil or gas, is gasified to produce syngas comprising $H_2$ and CO, scrubbed free of particles, and saturated with water. The syngas is then treated in an acid gas removal unit as desired to remove any impurities in the syngas. After processing the syngas in the AGR, it is routed to a hydrocarbon synthesis reactor. In the hydrocarbon synthesis reactor, the bulk of the $H_2$ and CO in the syngas is converted to synthetic hydrocarbons, the makeup of which is generally dependent on the type catalyst used in the reactor. The unreacted gas, or tailgas, exiting the reactor, is sent to the gas turbine as fuel. Optionally, N2 or natural gas can be added to the tailgas prior to the combustion turbine. N2 may also optionally be mixed with the hydrocarbon synthesis reactor feed to help control the reaction temperature. After being combusted in the combustor of a gas turbine, the combustion products are expanded to produce power. The expanded combustion products are then sent to a heat recovery steam generator (HRSG) to produce steam that can also be expanded to produce power.

20 Claims, 4 Drawing Sheets

MAKING FISCHER-TROPSCH LIQUIDS AND POWER

BACKGROUND OF THE INVENTION

The process and advantages of gasifying hydrocarbonaceous material into synthesis gas are generally known in the industry. In high temperature gasification processes, synthesis gas is commonly produced from gaseous combustible fuels, such as natural gas and/or associated gas, and liquid and solid combustible organic fuels, such as coal, residual petroleum, wood, tar sand, shale oil, and municipal, agriculture or industrial waste. The gaseous or liquid or solid combustible organic fuels are reacted with a reactive oxygen-containing gas, such as air, enriched air, or pure oxygen, and a temperature modifier, such as steam, in a gasification reactor to obtain the synthesis gas in a oxygen deficient environment.

In the reaction zone of a gasification reactor, the contents will commonly reach temperatures in the range of about 1,700° F. (930° C.) to about 3,0000° F. (1650° C.), and more typically in the range of about 2,000° F. (1100° C.) to about 2,800° F. (1540° C.). Pressure will typically be in the range of about 1 atmosphere (100 KPa) to about 250 atmospheres (25,000 KPa), and more typically in the range of about 15 atmospheres (1500 Kpa) to about 150 atmospheres (1500 KPa).

In a typical gasification process, the synthesis gas will substantially comprise hydrogen ($H_2$), carbon monoxide (CO), and lessor quantities of impurities, such as water ($H_2O$), carbon dioxide ($CO_2$), carbonyl sulfide (COS) and hydrogen sulfide ($H_2S$). The synthesis gas is commonly treated to remove or significantly reduce the quantity of impurities, particularly $H_2S$, COS, and $CO_2$ before being utilized in downstream processes. A number of acid gas removal systems are commercially available. Selection of acid gas removal system will depend on the degree of sulfur compounds and carbon dioxide removal required, and by the operating pressure of the acid gas removal system.

It is well known in the art that synthesis gas, also commonly referred to as syngas, can be converted to hydrocarbons in the presence of a variety of transition metal catalysts. Such metals are commonly called Fischer-Tropsch catalysts, and are known to catalyze the conversion of CO and $H_2$ to hydrocarbons. Common catalysts are cobalt and iron on an alumina support. Other Group VIII metals such as ruthenium and osmium are also active. Other single metals that have been investigated as catalysts include rhenium, molybdenum, and chromium. The activities of these catalysts are commonly enhanced by the addition of a variety of metals, including copper, cerium, rhenium, manganese, platinum, iridium, rhodium, molybdenum, tungsten, ruthenium or zirconium, among others. The general chemistry of the much studied Fischer-Tropsch synthesis is as follows:

$$nCO + 2nH_2 \rightarrow (-CH_2-)n + nH_2O + \text{Heat} \quad (1)$$

$$CO + H_2O \leftrightharpoons H_2 + CO_2 \quad (2)$$

The types and amounts of reaction products obtained via Fischer-Tropsch synthesis varies upon many conditions, such as reactor type, process conditions, and type of Fischer-Tropsch synthesis catalyst used. There are four main types of F-T reactors being used commercially: tubular fixed bed reactors, entrained bed reactors, fixed-fluidized bed reactors and slurry bubble column reactors. These reactors can operate in both high and low temperature Fischer Tropsch processes. There are generally two types of Fischer Tropsch synthesis catalysts, cobalt based and iron based catalysts. Typical products of the Fischer-Tropsch reaction include hydrocarbons from $C_1$ to $C_{200}$ or higher, with the bulk of the hydrocarbons product being in the $C_1$ to $C_{50}$ range with chain limiting catalyst. Most of the hydrocarbons produced are mixtures of olefins and paraffins. The Fischer-Tropsch reaction also produces varying amounts of carbon dioxide, water, and oxygenated components, including acids such as acetic acid, formic acid, propionic acid; alcohols such as methyl alcohol, ethyl alcohol, propyl alcohol, and longer chained alcohols; aldehydes, ketones and esters. Typically, these oxygenated components comprise 1 to 20 weight percent of the Fischer-Tropsch reaction product, and because of their water-soluble nature are commonly found in the wastewater product of a Fischer-Tropsch reactor. Some of the oxygenated compounds are also found in hydrocarbon phase. The amount of gaseous hydrocarbons, paraffin, olefins, $CO_2$, oxygenates, liquid hydrocarbons, water, etc. depends on the type of reactor, catalyst employed and process conditions. For example, iron catalysts generally produce longer chain hydrocarbons that are more olefinic, produce less amount of water, higher amounts of oxygenates and higher amounts of $CO_2$ as compared to cobalt catalyst. The Fischer-Tropsch reaction products are commonly divided into separate streams of tailgas, liquid hydrocarbons, and wastewater.

The product from a Fischer-Tropsch reactor typically comprise water vapor, $CO_2$, $N_2$, unreacted syngas ($H_2$ and CO), gaseous hydrocarbons ($C_1$–$C_5$), liquid hydrocarbon ($C_5$+) products, and various oxygenates. Generally, most of the water vapor, liquid hydrocarbon products and oxygenates are condensed and separated. This leaves the desired liquid hydrocarbon product and the oxygenate containing wastewater. The liquid hydrocarbon is processed in downstream product upgrading section and waste water is usually sent to a water treatment step.

What remains is the tailgas, which is comprised of water vapor, $CO_2$, $CH_4$, $N_2$, unreacted syngas ($H_2$ and CO), and vapor hydrocarbon products. The F-T tail gas can be recycled back to the gasification unit or can be recycled to the Fischer-Tropsch reactor inlet or burned as fuel.

Electric power can be generated efficiently in integrated gasification combined cycle (IGCC) systems. For IGCC application, the synthesis gas is fired as fuel to a gas turbine system that drives a generator to produce electric power. Hot turbine exhaust can passed to a heat recovery system to produce high pressure steam which can be expanded through a steam turbine to drive another electric generator to produce additional power. Such IGCC systems generate electricity in an efficient and environmentally sound manner.

The production of chemicals or liquid fuels from a portion of the synthesis gas, such as in a Fischer-Tropsch reactor, in a IGCC system is also well known and has the advantages of common operating facilities and economy of scale in the coproduction of electric power and chemicals. Several references in the background art describe existing technology for combined chemical plant/IGCC power plant operations.

IGCC systems have environmental advantages over traditional power plants that utilize liquid or solid carbonaceous fuels. Oxygen-derived synthesis gas, the gasification reactor product, is an attractive feedstock for the co-production of chemical and/or liquid fuel products and electric power. Integrating IGCC and chemical production plants is desirable, and such IGCC/chemical co-production plants will be installed and operated in coming years because of favorable environmental and economic advantages, and because methods to improve the efficiency and degree of integration of such plants have improved. The invention disclosed in the following specification and defined in the appended claims provides a template for such an IGCC/chemical co-production plant.

SUMMARY OF THE INVENTION

In order to enhance the returns of an IGCC power generation system, it is desirable to make high value by-products in addition to power whenever economically feasible. This invention will make synthetic hydrocarbons in conjunction with power and hydrogen production.

In the instant invention, hydrocarbonaceous fuel, such as coal, oil or gas, is gasified to produce syngas comprising $H_2$ and CO, scrubbed free of particles, and saturated with water. The syngas can then optionally partially shifted so as to provide the proper $H_2/CO$ ratio for the downstream hydrocarbon synthesis reactor, such as a Fischer-Tropsch (FT) reactor. The type of catalyst used in the downstream hydrocarbon synthesis reactor should be considered when deciding whether the syngas should be partially shifted. For instance, if an iron based catalyst is used, it may be desirable to leave the $H_2/CO$ ratio same as what comes out of gasifier and not send the syngas through a shift reactor. The shift reactor also converts any COS in the syngas to $H_2S$ and $CO_2$, allowing for the sulfur components ($H_2S$) and $CO_2$ to be readily removed in an acid gas removal (AGR) unit as desired. Optionally, a membrane/pressure swing absorber (PSA) system may be used to produce higher value export $H_2$ from the syngas. Part or all of this export $H_2$ may be used in the FT reactor at various stages to optimize yields.

After processing the syngas in the AGR unit and the optional PSA unit, it is routed to a hydrocarbon synthesis reactor, such as a FT reactor, instead being directly routed to a gas turbine. In the FT reactor, the bulk of the $H_2$ and CO in the syngas is converted to $C_1$–$C_{200}$ hydrocarbons. The makeup of the hydrocarbons is generally dependent on the type of FT catalyst used in the FT reactor. The unreacted gas, or tailgas, exiting the FT reactor, comprises $H_2$, CO, and some light hydrocarbons, usually in the $C_1$–$C_4$ range. The tailgas is first cooled to condense, separate, and recover any liquids, and is then sent to the gas turbine as fuel. Optionally, N2 or natural gas can be added to the tailgas prior to the combustion turbine. N2 may also optionally be mixed with the FT reactor syngas feed to help control the FT reaction temperature.

Commonly, the after being combusted in the combustor of a gas turbine, the combustion products are expanded to produce power. The expanded combustion products are then sent to a heat recovery steam generator (HRSG) to produce steam that can also be expanded to produce power. Heat from the shift, PSA, and FT reactors is integrated into the steam side of the IGCC power system, and may alternatively be used for process heat requirements or used to produce export steam.

DESCRIPTION OF ILLUSTRATIVE EMBODIMENTS

In the instant invention, carbonaceous fuel is first obtained and prepared for feeding to a gasification reactor. Carbonaceous fuel is any solid, liquid, or gaseous combustible organic material that can be used as feedstock to a gasification process to produce synthesis gas. The feedstock for a gasification process is usually a hydrocarbonaceous material, that is, one or more materials, generally organic, which provide a source of hydrogen and carbon for the gasification reaction. The hydrocarbonaceous material can be in a gaseous, liquid or solid state, or in a combination as desired, for example, a solid-liquid composition in a fluidized state.

The feed preparation step may not be necessary, given the composition and physical nature of the feedstock. Generally, solid carbonaceous fuels will need to be liquefied with oil or water prior to feeding to the gasifier. Liquid and gaseous carbonaceous fuels may be suitable for direct feed to the gasifier, but can be pre-treated for removal of any impurities that might be present in the feed.

The term liquid hydrocarbonaceous fuel as used herein to describe various suitable feedstocks is intended to include pumpable liquid hydrocarbon materials and pumpable liquid slurries of solid carbonaceous materials, and mixtures thereof. For example, pumpable aqueous slurries of solid carbonaceous fuels are suitable feedstocks. In fact, substantially any combustible carbon-containing liquid organic material, or slurries thereof may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuel feedstocks to the gasifier, is intended to include various materials, such as liquefied petroleum gas, petroleum distillates and residua, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof;

(3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

Gaseous hydrocarbonaceous fuels that may be burned in the partial oxidation gasifier alone or along with the liquid hydrocarbonaceous fuel includes vaporized liquid natural gas, refinery off-gas, $C_1$–$C_4$ hydrocarbonaceous gases, and waste carbon-containing gases from chemical processes.

After the feed preparation step, if used, the carbonaceous fuel is sent to a gasification reactor, or gasifier. In the gasifier, the carbonaceous fuel is reacted with a reactive free oxygen-containing gas. The term free-oxygen containing gas as used herein means air, oxygen-enriched air i.e. greater than 21 mole % $O_2$, and substantially pure oxygen, i.e. greater than about 95% mole oxygen (the remainder usually comprising $N_2$ and rare gases). Substantially pure oxygen is preferred, such as that that is produced by an air separation unit (ASU). The partial oxidation of the hydrocarbonaceous material is completed, advantageously in the presence of a temperature control moderator such as steam, in a gasification zone to obtain hot synthesis gas, or syngas. Syngas and synthesis gas can and are used interchangeably throughout this specification.

The need for a temperature moderator to control the temperature in the reaction zone of the gas generator depends in general on the carbon-to-hydrogen ratios of the feedstock and the oxygen content of the oxidant stream. A temperature moderator is commonly used with liquid hydrocarbon fuels with substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the burner. Other temperature moderators include $CO_2$-rich gas, nitrogen, and recycled synthesis gas.

A gasification reactor generally comprises a reaction zone, made up of a vertical cylindrically shaped steel pressure vessel lined with refractory, and a quench drum, such as shown in U.S. Pat. No. 2,809,104, which is incorporated herein by reference. A burner, such as shown in U.S. Pat. No. 2,928,460, which is incorporated herein by reference, may be used to introduce the feed streams into the reaction zone. In the reaction zone of a gasifier the contents will commonly reach temperatures in the range of about 1,700° F. (927° C.) to 3,000° F. (1649° C.), and more typically in the range of about 2,000° F. (1093° C.) to 2,800° F. (1538° C.). Pressure will typically be in the range of about 1 atmospheres (101 kPa) to about 250 atmospheres (25331 kPa), and more typically in the range of about 15 atmospheres (1520 kPa) to about 150 atmospheres (15,199 kPa), and even more typically in the range of about 60 atmospheres (6080 kPa) to about 80 atmospheres (8106 kPa). See U.S. Pat. No. 3,945,942 describing a partial oxidation burner assembly. See U.S. Pat. No. 5,656,044 describing a method and an apparatus for the gasification of organic materials. See also U.S. Pat. Nos. 5,435,940, 4,851,013, and 4,159,238 describing a few of the many gasification processes known in the prior art. The entire disclosures of the above referenced patents are hereby incorporated by reference and relied upon.

The hot gasification process product synthesis gas, or syngas, comprises carbon monoxide and hydrogen. Other materials often found in the synthesis gas include hydrogen sulfide, carbon dioxide, ammonia, cyanides, and particulates in the form of carbon and trace metals. The extent of the contaminants in the feed is determined by the type of feed and the particular gasification process utilized as well as the operating conditions. In any event, the removal of these contaminants is preferable to make gasification a viable process, and acid gas (e.g. $CO_2$ and $H_2S$) removal is very advantageous.

As the synthesis gas is discharged from the gasifier, it passes into the gasiffccation quench chamber for cleaning. The turbulent condition in the quench drum, caused by large volumes of gases bubbling up through the water helps the water to scrub much of the solids from the effluent gas. Large quantities of steam are generated within the quench vessel and saturate the syngas stream. The stream of raw gas is cooled in the quench drum and leaves at a temperature in the range of about 350° F. to 600° F. (about 175° C. to 315° C.), such as about 450° F. to 550° F. (about 230° C. to 290° C.), and a pressure in the range of about 500 to 2500 psia, such as about 1000 psia. Advantageously, fresh quench water is a mixture of make-up water and condensate produced subsequently in the process.

The syngas can optionally be subjected to further cooling and cleaning operations involving a scrubbing technique wherein the syngas is introduced into a scrubber and contacted with a water spray which further cools the syngas and removes particulates and ionic constituents from the synthesis gas. Cooling may not be desired, though, if the syngas is to be immediately processed in a subsequent reactor.

After the gasification step, the synthesis gas may be advantageously shifted with steam to convert CO in the synthesis gas to carbon dioxide and hydrogen by way of the water gas shift reaction to optimize the $H_2/CO$ ratio for use in the downstream Fischer-Tropsch reactor. If the desired product is hydrogen, the water gas shift reaction is desirable because it removes carbon monoxide, a poison for most $H_2$ consuming processes. The synthesis gas from the gasifier is shifted using steam and a suitable catalyst to form hydrogen as shown below.

$H_2O+CO=>H_2+Co_2$

The shift process, also called a water gas shift process or steam reforming, converts water and carbon monoxide to hydrogen and carbon dioxide. The shift process is described in, for example, U.S. Pat. No. 5,472,986, the disclosure of which is incorporated herein by reference. Steam reforming is a process of adding water, or using water contained in the gas, and reacting the resulting gas mixture adiabatically over a steam reforming catalyst. The advantages of steam reforming are both an increase the amount of hydrogen and a reduction in the carbon monoxide in the gas mixture.

The steam reforming catalyst can be one or more Group VIII metals on a heat resistant support. Conventional random packed ceramic supported catalyst pieces, as used for example in secondary reformers, can be used but, since these apply a significant pressure drop to the gas, it is often advantageous to use a monolithic catalyst having through-passages generally parallel to the direction of reactants flow.

The shift reaction is reversible, and lower temperatures favor hydrogen and carbon dioxide formation. However, the reaction rate is slow at low temperatures. Therefore, it is often advantageous to have high temperature and low temperature shift reactions in sequence. The gas temperature in a high temperature shift reaction typically is in the range 660° F. (350° C.) to 1920° F. (1050° C.). High temperature catalysts are often iron oxide combined with lesser amounts of chromium oxide. A preferred shift reaction is a sour shift, where there is almost no methane and the shift reaction is exothermic. Low temperature shift reactors have gas temperatures in the range of about 300° F. (150° C.) to 570° F. (300° C.), more typically between about 390° F. (200° C.) to 480° F. (250° C.). Low temperature shift catalysts are typically copper oxides that may be supported on zinc oxide and alumina. Steam shifting often is accompanied by efficient heat utilization using, for example, product/reactant heat exchangers or steam generators. Due to possible temperature requirements of the shift reactor, the syngas leaving the scrubbing unit may need to be preheated, and re-saturated with steam. Such shift reactors are known to the art. In lieu or processing the synthesis gas in a shift reactor, the $H_2/CO$ ratio may optionally be optimized by mixing a hydrogen rich effluent from a separate steam reforming process with the synthesis gas.

It is preferred that the design and operation of the shift reactor result in a minimum of pressure drop. Thus, the pressure of the synthesis gas is preserved. Generally a series of shift reactors is implemented to reach the desired conversion to hydrogen. This invention can be applied to a series of 1 to 4 shift reactors, but more often 2–3 shift reactors.

The use of the shift reaction to obtain proper $H_2/CO$ is one method to adjust the ratio. Other methods are useful as well, such as importing $H_2$ into the syngas or mixing the syngas with a higher $H_2/CO$ gas stream from, for example, steam methane reforming of natural gas. The higher $H_2/CO$ ratio syngas is desirable when cobalt catalyst is employed in the downstream hydrocarbon synthesis reactor, however lower $H_2/CO$ ratio syngas is prefered for iron catalysts and thus the use of shift reactor may not be employed.

After being processed in the shift unit, the synthesis gas can be sent to an acid gas removal unit so that the sulfur impurities in the syngas can be removed. The acid gas removal facilities for the synthesis gas, usually employing amine or physical solvents, removes the acid gases, particularly hydrogen sulfide, from the synthesis gas. The acid gas removal facilities typically operate at low temperatures. After the synthesis gas is cooled to below about 130° C., preferably below about 90° C., the contaminants in the gas, especially sulfur compounds and acid gases, can be readily removed. The synthesis gas is contacted with the solvent in an acid gas removal contactor. The contactor may be of any type known to the art, including trays or a packed column. Operation of such an acid removal contactor is known in the art. The cleaned syngas can then be used in many downstream processes. The degree of acid gas removal varies with the various downstream uses of the syngas. The recovered acid gases can also be sent to various recovery processes known in the art. After being processed in the acid gas removal step, the syngas is sent to an optional membrane/pressure swing adsorption (PSA) unit for $H_2$ by-product production. In one embodiment, the syngas stream leaving acid gas removal unit can be sent directly to the membrane/PSA unit. The entire syngas stream does not have to be directed to the membrane/PSA unit, as only that portion required by the hydrogen demand would be so routed. As a result, one embodiment of the present invention contemplates that no portion of the syngas be sent to the membrane/PSA unit.

Economical recovery of hydrogen from syngas streams often requires diffusion through a polymeric membrane and a PSA unit. In this process combination, a hydrogen-rich permeate is withdrawn from the membrane unit which employs a membrane that is selectively permeable to hydrogen. The hydrogen-rich membrane permeate is usually at a lower pressure, is thus compressed to a higher pressure, and is purified by the PSA system, using of a pressure change on the adsorbent beds, to yield a hydrogen product up to 99.999% purity. Waste streams from the membrane and PSA units often are used as fuel, and in the instant invention can be integrated into the steam side of the IGCC process to generate steam for power production or export, such as being fed to the subsequently described heat recovery steam generator as supplementary fuel. U.S. Pat. Nos. 4,398,926, 4,690,695, and 4,701,187 describe various integrations of polymeric membranes and PSA systems for the recovery of hydrogen from various gas mixtures.

The portion of the syngas not sent to the membrane/PSA unit and/or the waste stream from the membrane unit are then sent to a hydrocarbon synthesis reactor, such as a methanol synthesis reactor or a Fischer-Tropsch reactor, where it is contacted with a hydrocarbon synthesis catalyst. Optionally, a diluent gas, such as nitrogen, can be added to the feed to the Fischer-Tropsch reactor to help control the reaction temperature. It is within the contemplation of the present invention that at least some, if not all, of the syngas is sent to the Fischer-Tropsch reactor.

Hydrocarbon synthesis catalyst converts synthesis gas into hydrocarbon products. Common catalysts are cobalt and iron on an alumina support. Other Group VIII metals such as ruthenium and osmium are also active. Other single metals that have been investigated as catalysts include rhenium, molybdenum, and chromium. The activities of these catalysts are commonly enhanced by the addition of a variety of metals, including copper, cerium, rhenium, manganese, platinum, iridium, rhodium, molybdenum, tungsten, ruthenium or zirconium. Many other metals can be used, and it is within the scope of this invention to include all catalysts that convert synthesis gas in to hydrocarbon products. See U.S. Pat. Nos. 5,780,391, 5,162,284, 5,102,581, 4,801,573, and 4,686,238 for illustrations of some of the various types of catalyst that can be used to produce hydrocarbons from synthesis gas. The entire disclosures of the above referenced patents are hereby incorporated by reference and relied upon. The wide range of catalysts and catalyst modifications disclosed in the art directly correspond to an equally wide range of conversion conditions in the hydrocarbon synthesis reactor. Catalyst selection can provide some flexibility toward obtaining selected types of products, and some control over their molecular weight distribution.

The types and amounts of reaction products obtained via Fischer-Tropsch synthesis varies, and are generally dependent upon reactor type, process conditions, and type of Fischer-Tropsch synthesis catalyst employed. There are four main types of Fischer-Tropsch reactors that are used commercially: tubular fixed bed reactors, entrained bed reactors, fixed-fluidized bed reactors and slurry bubble column reactors. These reactors can operate in high or low temperature Fischer-Tropsch processes. There are generally two main types of Fischer-Tropsch synthesis catalyst: cobalt based and iron based catalysts. Typical products of the Fischer-Tropsch reaction include hydrocarbons from $C_1$ to $C_{200}$ or higher, with the bulk of the hydrocarbons products being in the $C_1$ to $C_{50}$ range using chain limiting catalyst. Most of the hydrocarbons produced are mixtures of olefins and paraffins. The Fischer-Tropsch reaction also produces varying amounts of carbon dioxide, water, and oxygenated components, including acids such as acetic acid, formic acid, propionic acid; alcohols such as methyl alcohol, ethyl alcohol, propyl alcohol, and longer chained alcohols; aldehydes, ketones and esters. Typically, these oxygenated components comprise 1 to 20 weight percent of the Fischer-Tropsch reaction product, and because of their water-soluble nature are commonly found in the wastewater product of a Fischer-Tropsch reactor. Some of the oxygenated compounds can also be found in hydrocarbon phase. The amount of gaseous hydrocarbons, paraffin, olefins, $CO_2$, oxygenates, liquid hydrocarbons, water, etc. differs depending on the type of reactor and catalyst employed and Fischer-Tropsch synthesis process conditions. For instance, iron catalyst generally produces longer chain hydrocarbons that are more olefinic, produces less amount of water, higher amount of oxygenates and higher amount of $CO_2$ as compared to cobalt catalyst. The Fischer-Tropsch reaction products are commonly divided into separate streams of tailgas, liquid hydrocarbons, and wastewater.

The Fischer-Tropsch liquid hydrocarbon stream is the desired product of the hydrocarbon synthesis reactor system.

This stream comprises any condensed hydrocarbons that have been separated from the condensed wastewater stream. This stream typically includes hydrocarbons chains from $C_5$ to $C_{200}$ or higher, with the bulk of the hydrocarbons produced being in the $C_1$ to $C_{50}$ range. Typically, from 40 to 80% of the liquid hydrocarbons produced are straight-chain olefins and paraffins. Commonly, FT processes are employed to produce gasoline or diesel fuel. The FT liquid hydrocarbons are usually used in downstream processes, combined with other hydrocarbon such as vacuum distillation bottoms, gas oil hydrocracker bottoms, light oil hydrotreater bottoms, petroleum coke and mixtures thereof, and can also be burned in the combustor of the subsequent gas turbine to produce power.

The Fischer-Tropsch liquid wastewater stream is the water product of a Fischer-Tropsch reactor system that has been condensed and separated from the Fischer-Tropsch liquids. This wastewater stream usually comprises water and the water soluble oxgynated components of the Fischer-Tropsch reaction products, such as acids, alcohols, aldehydes, ketones and esters. Hydrocarbons can also be found in the wastewater stream, subject to their solubility at the temperatures and pressures at which the condensation of the Fischer-Tropsch reaction products takes place. This wastewater stream is normally passed to a water treatment facility where it undergoes typical water treatment steps known in the art, such as anaerobic digestion and biological oxidation, in order to remove the contaminants and produce clean water for disposal or use.

The Fischer-Tropsch tailgas, or residue gas, stream is the gaseous product of a Fischer-Tropsch reactor that does not condense when the reaction products are cooled. The tailgas typically comprises unconverted syngas and uncondensed products, typically CO, $H_2$, $CO_2$, $CH_4$, $C_2H_6$, $H_2O$, $N_2$, Ar, and, depending on the catalyst, other hydrocarbons.

The tailgas stream can then be utilized for power generation. The tailgas is combusted and the combusted gas is expanded to produce power by an electric generator driven by an expansion turbine. Commonly, the gasifier syngas product is used in this manner for power production, and if a fraction of it is used as such, the tailgas could be combined with it prior to combustion. The heating value and the composition of the FT tailgas stream is an important consideration when using the tailgas for power production. Thus, additional fuel, such as natural gas, may need to be added to the FT tailgas stream to increase the heating value of the combustor feed stream.

Frequently, the combustor feed stream is mixed with a diluent gas, such as nitrogen gas or water vapor, and then fed to the combustor of a gas turbine for power production. The mass flow of the diluent gas, preferably nitrogen, helps to increase the power generation and reduce NOx gasses produced by the combustion of the syngas in the gas turbine combustor. Due to the introduction of saturated $N_2$ and saturated fuel gas, the concentration of oxides of nitrogen ($NO_x$) in the exhaust gas is substantially nil, below 50 ppm (vol) on dry 2% $O_2$ basis.

Air is also commonly added to the combustor feed stream. The air is compressed by means of a turbocompressor that is driven by the coaxial expansion turbine which along with the combustor are the principal parts of the gas turbine. The compressed air enters the combustor at a temperature in the range of about 400° F. to 850° F. (about 425° C. to 455° C.) and at substantially the same pressure as the Fischer-Tropsch tailgas and optional diluent gas. A portion of the compressed air can also provide feed air to an air separation unit (ASU) that provides oxygen to the gasification step and nitrogen as diluent to the gas turbine.

An ASU is used to separate air into separate streams of substantially pure oxygen gas and nitrogen gas. A portion or all of the nitrogen gas is saturated with water, superheated, and introduced into the combustor of a gas turbine along with the stream of Fischer-Tropsch tail-gas and optional fuel gas. The stream of oxygen gas from the ASU is usually introduced into the reaction zone of the partial oxidation gas generator by way of one passage in an annulus-type burner.

The hot exhaust gas leaving the expansion turbine portion of the gas is passed through a conventional heat recovery steam generator (HRSG) prior to being discharged to the atmosphere. Steam for operating a conventional steam turbine comprising a high pressure expansion turbine in tandem with a coaxial intermediate expansion turbine, and steam for process needs, is produced in the HRSG. For example, superheated high pressure steam from the HRSG can be introduced into a high pressure expansion turbine (HPT) for power production. Intermediate pressure exhaust steam leaves the HPT and can also be superheated in the HRSG, and introduced into an intermediate pressure expansion turbine (IPT) to produce additional power. Power production using steam is very similar to power production using combusted gas. The steam is expanded through expansion turbines to drive electric generators for the production of electricity. A portion of the produced steam could be used as the temperature moderator in the gasification unit, to superheat the FT tailgas/diluent feed stream to the gas turbine, but the balance of the steam, preferably as much steam as possible, is used in the steam turbines for power production.

Figure 1:
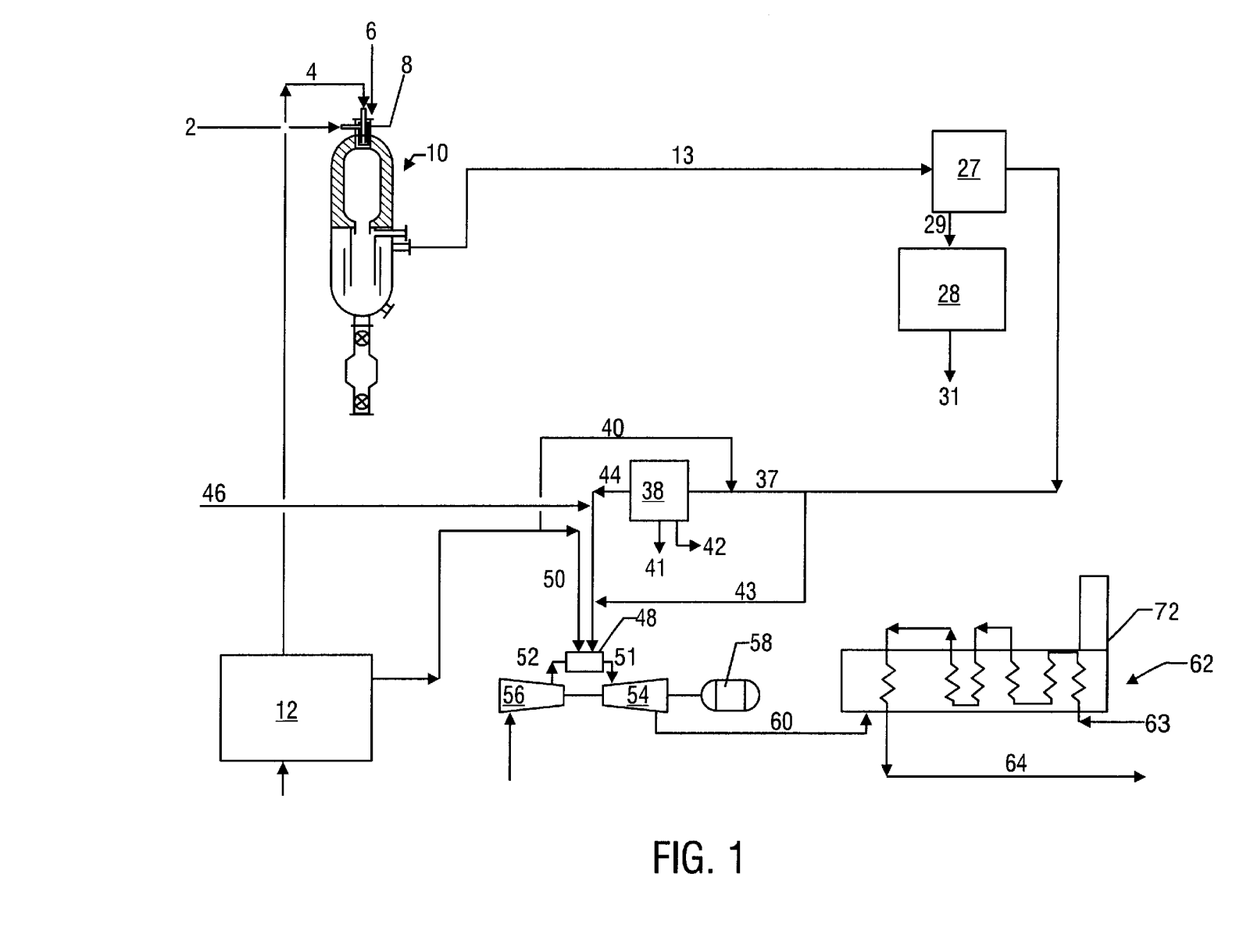
FIG. 1 describes a basic embodiment of the present invention, integrating synthetic hydrocarbon synthesis with power production.

FIG. 1 shows a basic embodiment of the present invention. Hydrocarbonaceous fuel 2, free-oxygen containing gas 4 and a temperature moderating gas 6 enter gasification reactor 10 through nozzles in burner 8. The free-oxygen containing gas 4 is preferably produced by an air separation unit 12. The syngas product 13 is then processed in an acid gas removal (AGR) unit 27 where sulfur components 29 in the syngas are removed and sent to the sulfur recovery unit 28 to recover sulfur 31.

After processing in the AGR unit, at least a portion of the syngas 37 is sent to the Fischer-Tropsch reactor 38. Optionally, nitrogen 40 from the ASU 12 is added to the FT reactor 38 feed to modify the temperature in the reactor. The FT reactor produces the desired FT liquid synthetic hydrocarbons 41, a FT wastewater stream 42, and a FT tailgas stream 44. The FT tailgas stream 44 is then joined with the syngas 43 not processed in the FT reactor, optionally combined with natural gas 46, nitrogen 50 from the ASU and compressed air 52, and then sent to the combustor 48 of the gas turbine. The combustion gasses 51 are then expanded in expander 54 that drives the air compressor 56 and the power generator 58. The expanded combustion gas 60 is then passed to the HRSG 62, where heat from the expanded combustion gas 60 is used to heat boiler feed water 63 to produce steam 64. This steam can be exported for use as a heat source in other processes, or can be expanded to produce additional power. Finally, the combustion gasses are released to the atmosphere through stack 72 on the HRSG 62.

Figure 2:
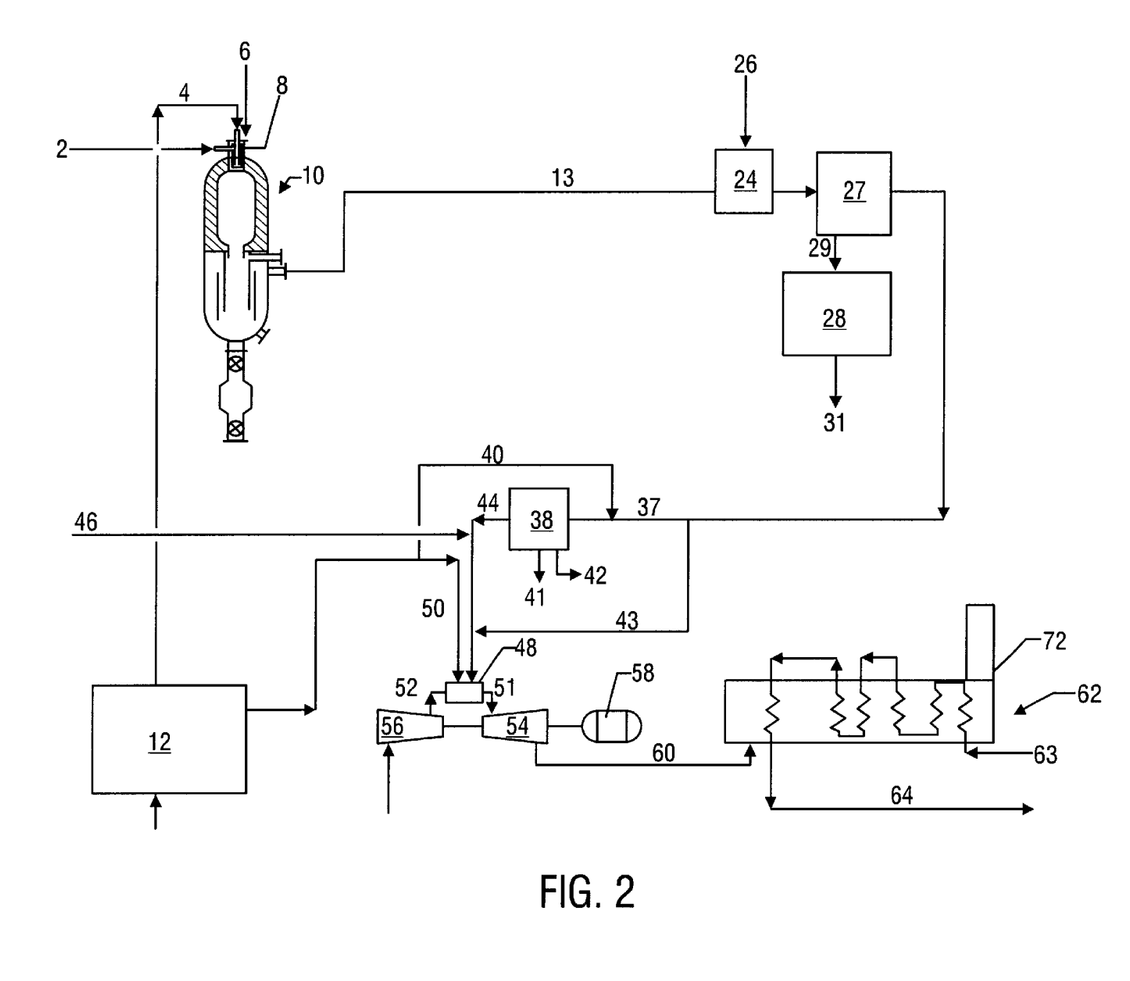
FIG. 2 illustrates one preferred embodiment of the present invention, integrating synthetic hydrocarbon synthesis with power production and a shift reactor.

FIG. 2 shows another embodiment of the present invention, and is substantially the same as FIG. 1 but has a shift reactor integrated into the system. Thus, for convenience purposes, the same unit and line numbers are used as in FIG. 1 where applicable. Hydrocarbonaceous fuel 2, free-oxygen containing gas 4 and a temperature moderating gas 6 enter gasification reactor 10 through nozzles in burner 8. The free-oxygen containing gas 4 is preferably produced by an air separation unit 12. A portion, all, or none of the syngas product 13 from the gasification reactor 10 is then sent to the shift unit 24, where CO is converted in the presence of water to $H_2+CO_2$, to optimize the $H_2/CO$ ratio in the syngas. Because water is a reactant in the shift unit reaction, steam 26 may be added to the feed to the shift unit. All of the syngas is then processed in the acid gas removal (AGR) unit 27 where sulfur components 39 in the syngas are removed and sent to the sulfur recovery unit 28 to recover sulfur 31.

After processing in the AGR unit, at least a portion of the syngas 37 is sent to the Fischer-Tropsch reactor 38. Optionally, nitrogen 40 from the ASU 12 is added to the FT reactor 38 feed to modify the temperature in the reactor. The FT reactor produces the desired FT liquid synthetic hydrocarbons 41, a FT wastewater stream 42, and a FT tailgas stream 44. The FT tailgas stream 44 is then joined with the syngas 43 not processed in the FT reactor, optionally combined with natural gas 46, nitrogen 50 from the ASU and compressed air 52, and then sent to the combustor 48 of the gas turbine. The combustion gasses 51 are then expanded in expander 54 that drives the air compressor 56 and the power generator 58. The expanded combustion gas 60 is then passed to the HRSG 62, where heat from the expanded combustion gas 60 is used to heat boiler feed water 63 to produce steam 64. This steam can be exported for use as a heat source in other processes, or can be expanded to produce additional power. Finally, the combustion gasses are released to the atmosphere through stack 72 on the HRSG 62.

Figure 3:
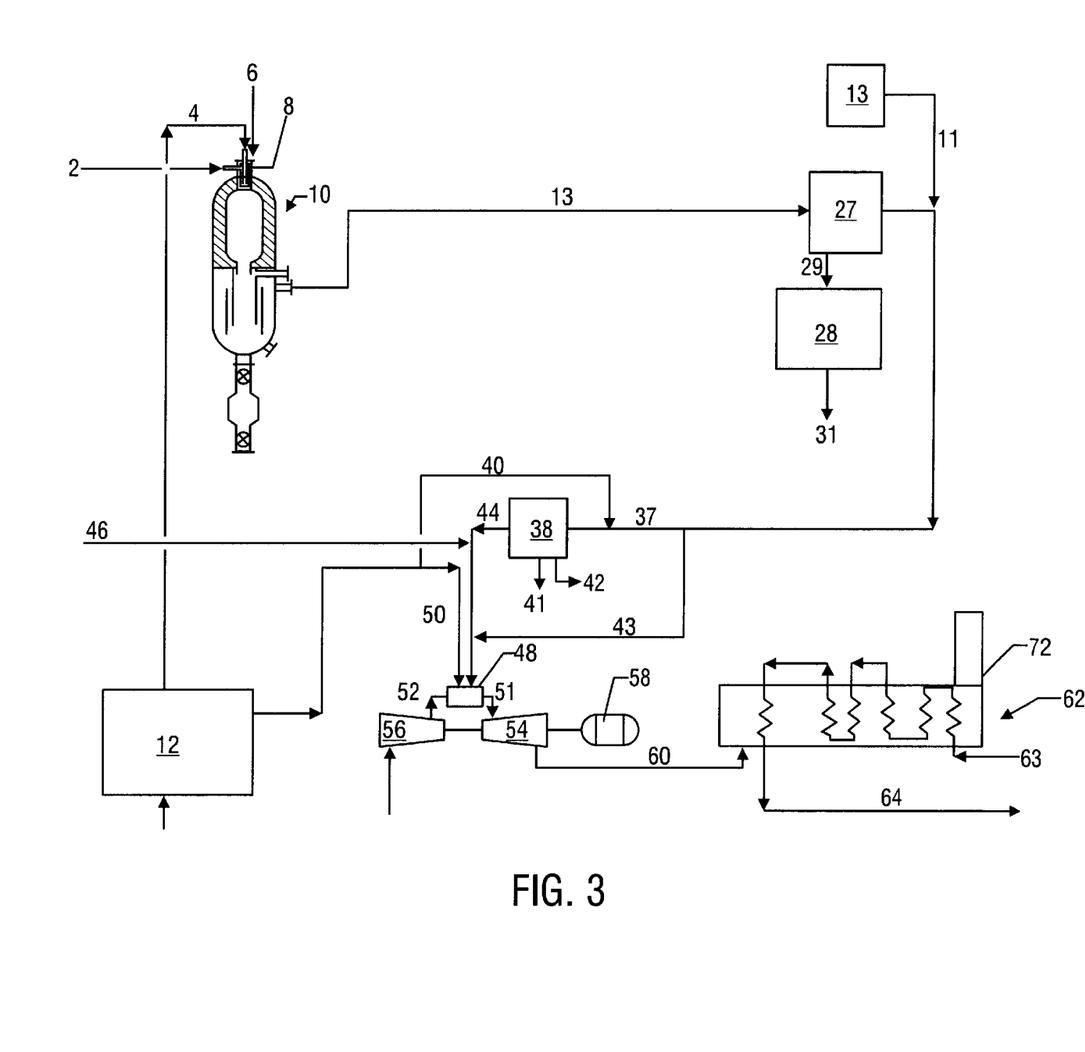
FIG. 3 shows one preferred embodiment of the present invention, integrating synthetic hydrocarbon synthesis with power production and a separate steam reforming step.

FIG. 3 shows another embodiment of the present invention, and is substantially the same as FIG. 1 but has the effluent from a separate steam reforming step integrated into the system. Thus, for convenience purposes, the same numbers are used as in FIG. 1. Hydrocarbonaceous fuel 2, free-oxygen containing gas 4 and a temperature moderating gas 6 enter gasification reactor 10 through nozzles in burner 8. The free-oxygen containing gas 4 is preferably produced by an air separation unit 12. The syngas is processed in the acid gas removal (AGR) unit 27 where sulfur components 29 in the syngas are removed and sent to the sulfur recovery unit 28 to recover sulfur 31. The syngas is then combined with hydrogen rich gas 11 from a steam reformer 13, to optimize the $H_2/CO$ ratio in the syngas.

After processing in the AGR unit and combining with hydrogen rich steam reformer gas, at least a portion of the syngas 37 is sent to the Fischer-Tropsch reactor 38. Optionally, nitrogen 40 from the ASU 12 is added to the FT reactor 38 feed to modify the temperature in the reactor. The FT reactor produces the desired FT liquid synthetic hydrocarbons 41, a FT wastewater stream 42, and a FT tailgas stream 44. The FT tailgas stream 44 is then joined with the syngas 43 not processed in the FT reactor, optionally combined with natural gas 46, nitrogen 50 from the ASU and compressed air 52, and then sent to the combustor 48 of the gas turbine. The combustion gasses 51 are then expanded in expander 54 that drives the air compressor 56 and the power generator 58. The expanded combustion gas 60 is then passed to the HRSG 62, where heat from the expanded combustion gas 60 is used to heat boiler feed water 63 to produce steam 64. This steam can be exported for use as a heat source in other processes, or can be expanded to produce additional power. Finally, the combustion gasses are released to the atmosphere through stack 72 on the HRSG 62.

Figure 4:
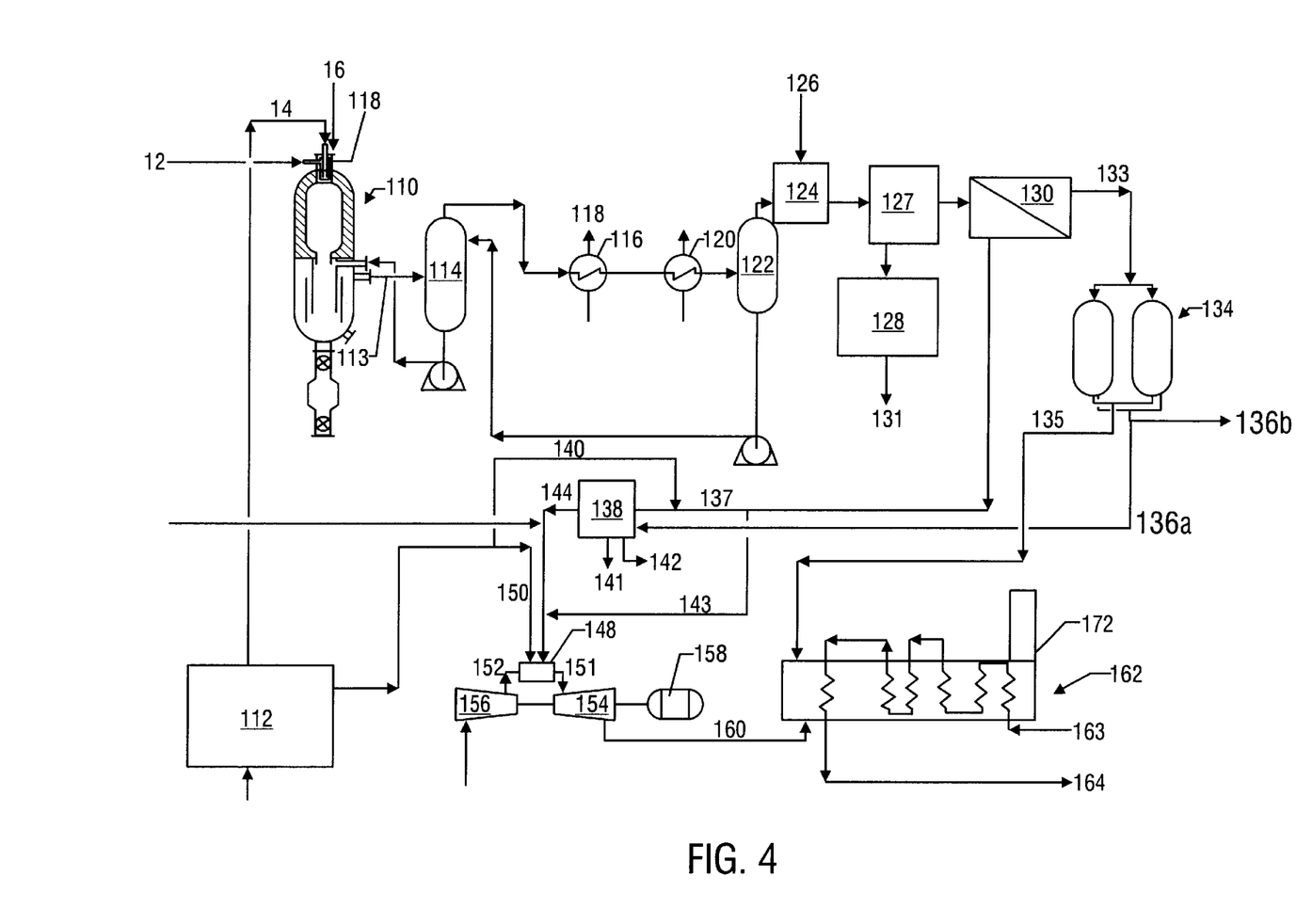
FIG. 4 sets forth another preferred embodiment of the present invention, integrating synthetic hydrocarbon synthesis, power production, a shift reactor, and hydrogen production.

Referring now to FIG. 4, another embodiment of the present invention is described in schematic form. Hydrocarbonaceous fuel 12, free-oxygen containing gas 14 and a temperature moderating gas 16 enter gasification reactor 110 through nozzles in burner 118. The free-oxygen containing gas 14 is preferably produced by an air separation unit 112. The syngas product 113 is cleaned cooled in gas scrubber 114, and then can be cooled in exchanger 116 to produce steam 118, and further cooled in exchanger 120. The syngas is then sent to knockout vessel 122, where any condensed water is removed and recycled to the gas scrubber 114. Cooling the gas may not be advantageous, though, due to the temperature requirements of the subsequent shift unit 124, and any syngas cooling/heat recovery benefits will have to be assessed by those of skill in the art when operating this system.

In the shift unit 124, CO is converted in the presence of water to $H_2+CO_2$. Because water is a reactant in the shift unit reaction, steam 126 may be added to the feed to the shift unit. After being processed in the shift unit 124, the syngas is processed in the acid gas removal unit (AGR) 127 where sulfur components 129 in the syngas are removed and sent to the sulfur recovery unit 128 to recover sulfur 131. At least a portion 132 of the sweetened syngas is then passed to a hydrogen membrane system 130 where a substantially pure hydrogen stream 133 is produced and sent to PSA unit 134. A pure hydrogen stream is produced, and can optionally be sent to the downstream Fischer-Tropsch reactor 138 via line 136a to optimize the FT reactor conversion, or be exported via line 136b to other processes and users. The PSA tailgas stream 135 is preferably sent to the downstream HRSG 162 for use as fuel for steam production, but can be used as a fuel source for other processes as well.

After the portion of the syngas is processed in the membrane system 130, it is recombined with any syngas not sent to the membrane system 130 and at least a portion of the syngas 137 is sent to the Fischer-Tropsch reactor 138. Optionally, nitrogen 140 from the ASU 112 is added to the FT reactor 138 feed to modify the temperature in the reactor. The FT reactor produces the desired FT liquid synthetic hydrocarbons 141, a FT wastewater stream 142, and a FT tailgas stream 144. The FT tailgas stream 144 is then joined with the syngas 143 not processed in the FT reactor, optionally combined with natural gas 146, nitrogen 150 from the ASU and compressed air 152, and then sent to the combustor 148 of the gas turbine. The combustion gasses 151 are then expanded in expander 154 that drives the air compressor 156 and the power generator 158. The expanded combustion gas 160 is then passed to the HRSG 612, where heat from the expanded combustion gas 160 is used to heat boiler feed water 163 to produce steam 164. This steam can be exported for use as a heat source in other processes, or can be expanded to produce additional power. Finally, the combustion gasses are released to the atmosphere through stack 172 on the HRSG 162.

The above illustrative embodiments are intended to serve as simplified schematic diagrams of potential embodiments of the present invention. One of ordinary skill in the art of chemical engineering should understand and appreciate that specific details of any particular embodiment may be different and will depend upon the location and needs of the system under consideration. All such layouts, schematic alternatives, and embodiments capable of achieving the present invention are considered to be within the capabilities of a person having skill in the art and thus within the scope of the present invention.

While the apparatus, compounds and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention.

What is claimed is:

1. A process for simultaneously generating power and synthesizing liquid hydrocarbons, comprising:
   partially oxidizing a hydrocarbon feed by reacting said feed with an oxygen-rich gas, thereby generating a synthesis gas mixture comprising carbon monoxide and hydrogen;
   purifying the synthesis gas mixture;
   reacting at least a portion of said synthesis gas mixture over a hydrocarbon synthesis catalyst to produce hydrocarbon liquids and residue gas;
   separating said hydrocarbon liquids from said residue gas;
   reacting said residue gas along with the remaining synthesis gas with an oxygen containing gas to produce combustion product gases;
   expanding said combustion product gases through a turbine to generate power and to make expanded combustion product gases;
   making steam by cooling said expanded combustion product gases in a heat recovery steam generator; and
   expanding the steam in a steam turbine to generate power.

2. The process of claim 1, further comprising separating air to produce a nitrogen-rich fraction and said oxygen-rich gas.

3. The process of claim 2, further comprising mixing at least a portion of said nitrogen-rich fraction with said residue gas before expanding said residue gas.

4. The process of claim 2, further comprising controlling the temperature of a reactor containing said hydrocarbon synthesis catalyst by mixing at least a portion of said nitrogen-rich fraction with said synthesis gas mixture.

5. The process of claim 1, further comprising increasing the ratio of hydrogen to carbon monoxide in said synthesis gas mixture.

6. The process of claim 5, wherein increasing said ratio comprises passing said synthesis gas mixture over a water-gas shift catalyst to convert water vapor and carbon monoxide to hydrogen and carbon dioxide.

7. The process of claim 5, wherein increasing said ratio comprises mixing said synthesis gas mixture with a hydrogen-rich gas.

8. The process of claim 7, wherein said hydrogen-rich gas comprises effluent from a steam reformer.

9. The process of claim 1, wherein said synthesis gas mixture further comprises sulfur oxides, and said process further comprises the step of removing said sulfur oxides from said synthesis gas mixture.

10. The process of claim 9, further comprising recovering elemental sulfur from said sulfur oxides.

11. The process of claim 1, further comprising burning at least a portion of said hydrocarbon liquids to generate additional power.

12. The process of claim 1, further comprising blending at least a portion of said hydrocarbon liquids with a heavy hydrocarbons fraction selected from the group consisting of vacuum distillation bottoms, gas oil hydrocracker bottoms, light oil hydrotreater bottoms, petroleum coke and mixtures thereof.

13. The process of claim 1, further comprising extracting hydrogen from said synthesis gas mixture.

14. The process of claim 13, further comprising returning at least a portion of said extracted hydrogen to a reactor containing said hydrocarbon synthesis catalyst.

15. The process of claim 1, wherein said hydrocarbon synthesis catalyst comprises a Fischer-Tropsch catalyst.

16. The process of claim 15, wherein said hydrocarbon liquids comprise gasoline.

17. The process of claim 15, wherein said hydrocarbon liquids comprise diesel fuel.

18. The process of claim 1, wherein said hydrocarbon synthesis catalyst comprises a methanol synthesis catalyst.

19. The process of claim 1, wherein said hydrocarbon feed comprises coke.

20. The process of claim 1, wherein said hydrocarbon feed comprises coal.

* * * * *